ary Examiner—Harrison L. Hinson
United States Patent

Jones

[15] 3,688,366
[45] Sept. 5, 1972

[54] CUTTING TOOL
[72] Inventor: Dennis Glyn Jones, Greensburg, Pa.
[73] Assignee: Kennametal Inc., Latrobe, Pa.
[21] Appl. No.: 54,524

[52] U.S. Cl. ................................................29/96
[51] Int. Cl. ............................................B26d 1/00
[58] Field of Search.........................29/95, 96, 97, 98

[56] References Cited

UNITED STATES PATENTS

| | | |
|---|---|---|
| 2,737,705 | 3/1956 | Novkov..........................29/96 |
| 2,846,758 | 8/1958 | Novkov..........................29/96 |
| 3,499,198 | 3/1970 | Pollard et al. ..................29/96 |
| 3,124,864 | 3/1964 | Frommelt et al. ..............29/96 |
| 3,500,522 | 3/1970 | Stier...............................29/96 |
| 3,497,935 | 3/1970 | Bowling..........................29/96 |
| 3,551,977 | 1/1971 | Novkov..........................29/96 |

Primary Examiner—Harrison L. Hinson
Attorney—Melvin A. Crosby

[57] ABSTRACT

The specification discloses a cutting tool especially useful for cut-off and grooving operations. The tool comprises a relatively massive block-like body with a plate adjustably mounted on one side and having a V-groove in the top toward one end extending longitudinally of the plate and adapted to receive an elongated cutting element having a ridge on the bottom engaging said groove, or a short cutting element with an elongated clamping bar both seated in the groove and held in place by a clamp mounted on the block.

15 Claims, 6 Drawing Figures

PATENTED SEP 5 1972 3,688,366

INVENTOR.
DENNIS GLYN JONES
BY

INVENTOR.
DENNIS GLYN JONES

CUTTING TOOL

The present invention relates to a cutting tool and, in particular, to such a tool especially adapted for grooving and cut-off operations.

Grooving and cut-off tools are, in general, well known and are widely used in machining operations for the purpose of forming grooves in work pieces, as in a lathe, or for the purpose of cutting off bar stock and the like. Both operations require a relatively narrow cutting tool and, especially in cut-off operations, considerable length of the tool may be required in order successfully to carry out the operation. Cut-off tools heretofore have been relatively expensive and have not always been easy to adjust and have been lacking in the required strength and rigidity, particularly for cut-off operations which are quite often carried out at high feed rates.

The present invention is concerned with a cut-off and grooving tool of the nature referred to which is relatively inexpensive to make and easy to adjust and which has adequate strength for all purposes. The cut-off tool of the present invention is, furthermore, capable of being constructed so as to employ a minimum amount of hard cutting tool material in the form, for example, of hard cemented carbide.

The cutting tool of the present invention is also capable of being relatively simple constructed of relatively inexpensive and easily replaceable components.

The nature of the present invention will become more clearly apparent upon reference to the following detailed description taken in connection with the accompanying drawings in which.

BRIEF SUMMARY OF THE INVENTION

The tool of the present invention comprises a support block of rather massive dimensions so as to be able to sustain all loads imposed thereon and adapted for being clamped in a machine tool as, for example, in the tool block thereof or in a turret. A support plate is detachably and adjustably clamped against one side of the block and takes a bearing along its lower edge on the block. The upper edge of the support plate has a longitudinal V-shaped upwardly opening groove therein and it is concave in the upward direction when viewed from the side of the plate.

The plate extends beyond the block at one end and carries a cutting insert at the said extending end which, in turn, projects beyond the end of the support plate. The cutting insert is, for example, a hard cemented carbide such as a tungsten carbide or titanium carbide composition.

A clamp bar is also mounted in the groove in the top edge of the support plate and engages the cutting insert and is held in position by a clamp element mounted on the block and engaging the top edge of the clamping bar. The clamping bar may be separate from the insert, or it may be brazed thereto or it may be integral therewith.

The support plate is preferably longitudinally adjustable on the block and the clamping bar and cutting insert may, furthermore, be longitudinally adjustable on the support plate.

DETAILED DESCRIPTION

Figure 1:
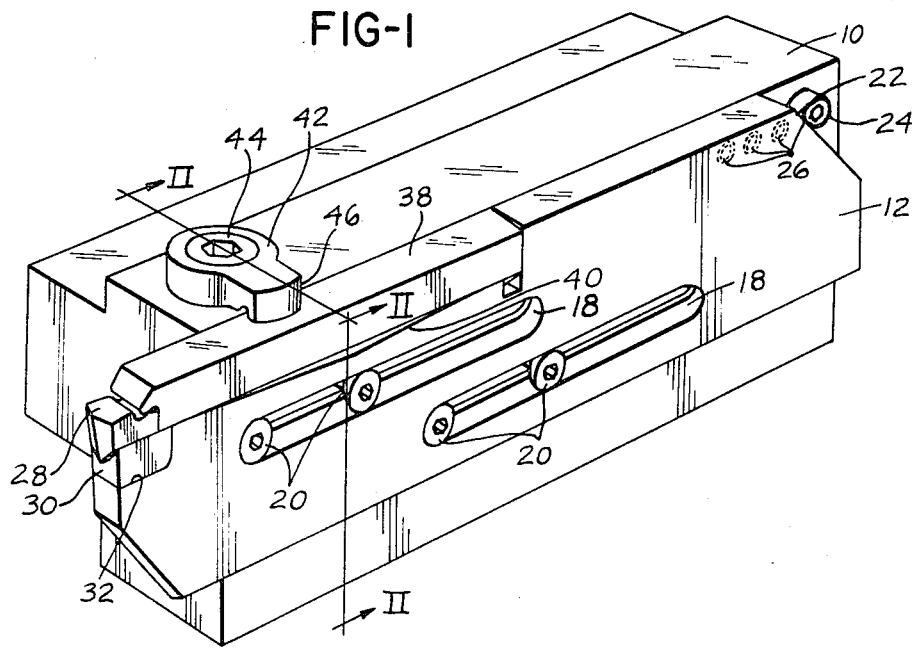
FIG. 1 is a perspective view showing one form which the cut-off and grooving tool according to the present invention can take.
Figure 2:
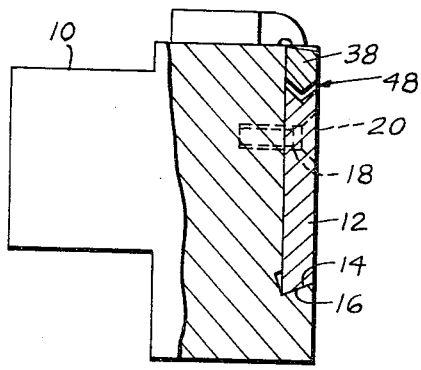
FIG. 2 is a transverse vertical section through the tool and is indicated by the cutting plane II—II—II on FIG. 1.
Figure 3:
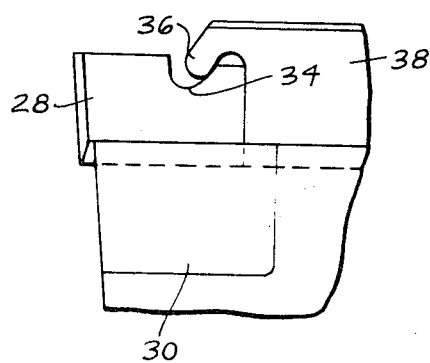
FIG. 3 is a fragmentary view drawn at enlarged scale and showing the manner in which the hard cutting insert is supported on the tool structure and clamped in position thereon.

Referring to the drawings more in detail, the modification illustrated in FIGS. 1 to 3 will be seen to comprise a rather massive support block 10 which carries a support plate 12 on one side thereof. The lower edge of the support plate is preferably tapered as at 14 and block 10 has a complementarily shaped ledge 16 formed thereon on which the tapered edge portion 14 of plate 12 rests. The plate 12 is formed with at least one, and preferably, two longitudinally extending slots 18 through which screws 20 extend into threaded engagement with block 10 for firmly clamping the support plate against the side of the block.

The screws 20 can be cone headed and seat in correspondingly shaped slots so as not to project beyond the surface of plate 12 but for many operations it is satisfactory for the screws 20 to be of the conventional button headed type and in which case the slots 18 can be simple straight slots and the screw heads in that case will project outwardly from the outer face of plate 12.

At one end, plate 12 has an angular cut-off at 22 adapted for abutting the head of an abutment screw 24 threaded into block 10. Block 10 advantageously has a plurality of threaded holes 26 for receiving screw 24 to provide for adjusted positions of plate 12 on the side of block 10.

At the end of plate 12 opposite abutment screw 24, the plate projects outwardly from the adjacent end of block 10 and is adapted for supporting a cutting insert 28 which may, as mentioned, consist of a material such as a cemented hard metal carbide. Insert 28 may rest on a shim member 30 preferably brazed in a notch 32 provided therefor in the top edge of support plate 10. Beneath shim 30, plate 12 is cut backwardly at an angle so as to provide adequate clearance from the work piece being machined. The shim 30 of FIGS. 1 and 2 is optional and can be left out of the combination, if desired.

Insert 28, as will be seen in FIG. 3, has a rearwardly disposed transverse notch 34 therein adapted for engagement by the hook shaped nose 36 of a clamp bar 38. Clamp bar 38 extends longitudinally along the upper edge of plate 12 in an elongated notch 40 in the plate provided for that purpose. The rear end of clamp bar 38 abuts the rear end of notch 40 and is thus solidly supported against axial movement in the rearward direction on plate 12.

A clamping element 42 is secured to block 10 by screw 44 and has a nose portion 46 engaging the top of clamp bar 38 whereby the clamp bar 38 and insert 28 can be fixedly clamped in place on support plate 12.

As will be seen in FIG. 2, the upper surface of clamp bar 38 preferably inclines downwardly toward the outside at least in the region thereof engaged by nose 46 of clamp element 42, thereby to hold the clamp bar and insert and support plate 12 against deflection outwardly away from block 10.

The aforementioned notch 40 and the lower edge of clamp bar 38 and also the lower edge of insert 28 are formed to complementary V-shapes as indicated by reference numeral 48 in FIG. 2. Furthermore, notch 40 when viewed from the side of plate 12 is concave in the upward direction so that when clamp bar 38, which is straight, is placed in position and the clamping element tightened up thereon, the clamp bar will take a bearing at the rear end of the notch 40 and at the point of engagement of the clamp bar with the insert and the insert will, in turn, take a bearing at the front end of notch 40 which is that portion thereof that is disposed in shim 30.

The last mentioned portion of the notch 40 is advantageously linear so that an extremely good bearing for the insert is obtained. Also, due to the spaced points of support for clamp bar 38, the clamping force exerted thereby on the insert is not in any way diminished but is maintained at a maximum.

The insert 28 preferably tapers outwardly toward the front end thereof at the sides with about a 10° included angle between the sides. The insert 28, furthermore, preferably tapers inwardly toward the bottom with an included angle between the lateral sides of, say, 5°.

Still further, the front of the insert tapers toward the rear in the downward direction at an angle on the order of about 5° or 6°. The clamp bar 38 and the shim 30 and support plate 12 are all constructed to be more narrow than the widest part of insert 28 and, in this manner, clearance is maintained about the cutting edge of the insert and between the work piece and the shim and support plate for all grooving and cut-off operations.

Figure 4:
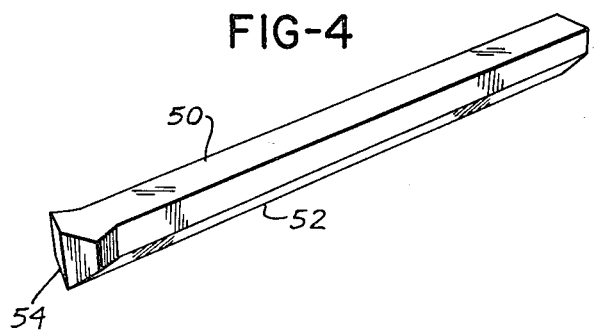
FIG. 4 is a perspective view showing the manner in which a cutting insert can be made integrally with the support shank therefor.

FIG. 4 shows how the cutting element for a tool of the nature described could be formed integrally with the clamp bar portion. In FIG. 4, a bar-like element 50 of cemented carbide is illustrated having a V-shaped formation 52 extending along the straight lower side thereof for engagement with the upwardly concave notch in the top of the support plate and with the outer end 54 of the member shaped to form the cutting insert.

More specifically, the end of the element which is disposed at the edge of the support plate which is presented to the work to be cut tapers outwardly on the sides at the top while the sides taper inwardly toward the bottom and the front edge of the cutting portion of the member tapers backwardly.

Both of the modifications of FIGS. 1 and 4 show a cutting insert with a zero rake angle but it will be understood that the top surface of the cutting insert portion could be formed at any desired angle so as to have either positive or negative rake angle if zero rake angle was not desired.

Furthermore, while the front edge of the insert is in the form of a shallow "V" with the apex presented toward the work, this edge of the cutting insert could be straight or could be formed to an angle or could have any other configuration desired.

Figure 5:
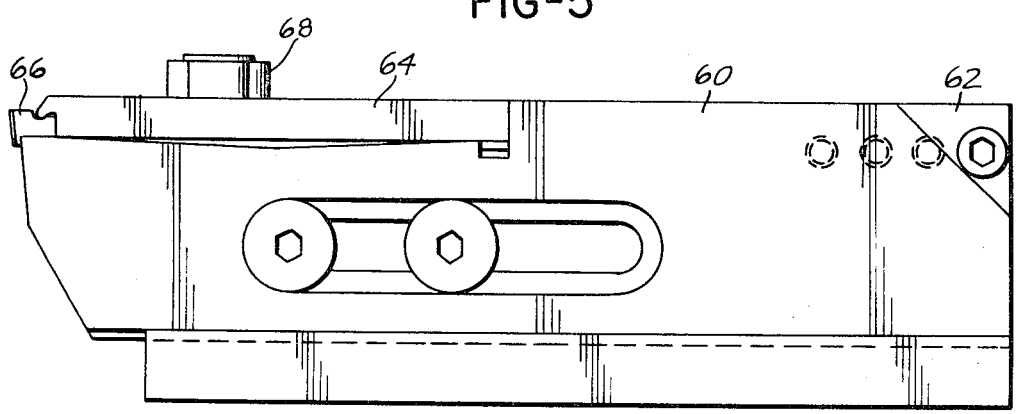
FIG. 5 is a side elevational view showing a modified form which a tool according to the present invention can take.

FIG. 5 shows a modification wherein the support plate 60 mounted on the side of block 62 is, itself, formed of carbide material. By forming plate 60 of carbide material extremely high rigidity is imparted thereto so that the support plate will have a minimum tendency to deflect under load. The plate 60 in FIG. 5 has the same upwardly concave V-shaped groove formed therein for receiving the clamp bar 64 and insert 66 and which are held in place by clamping element 68 all as described in connection with the modification of FIG. 1.

In FIG. 5, due to the fact that the entire support plate 60 is formed of carbide, it is not necessary to provide a shim for the insert 66 to rest upon.

Figure 6:
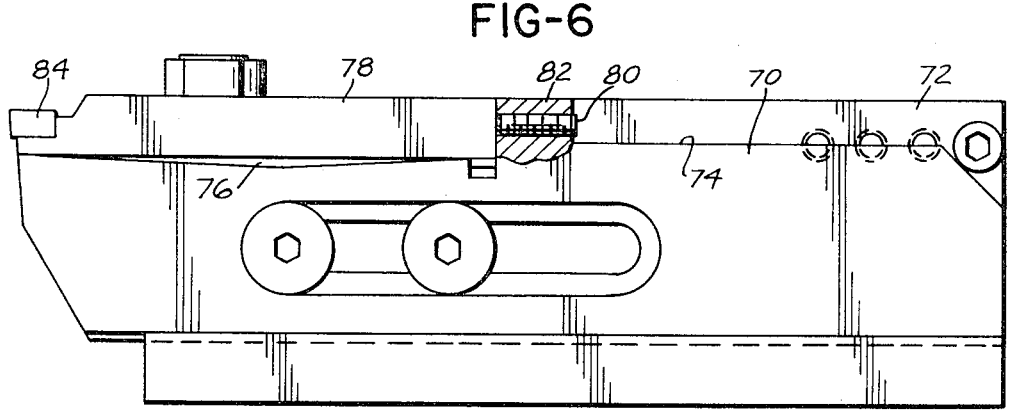
FIG. 6 is a view similar to FIG. 5 but showing still another modification of the tool.

FIG. 6 shows a modification wherein the support plate 70 secured to the side of block 72 is provided with a cut-out portion 74 disposed rearwardly of the notch 76 in which clamp bar 78 is disposed. The provision of the cut-out 74 in spaced relation to notch 76 permits the use of an adjusting screw 80 threaded in the upstanding portion 82 of the support plate so that the clamp bar 78 can be finely adjusted on support plate 70.

FIG. 6 also shows another modification in which the cutting element 84 is brazed in place on the end of clamp bar 78. The fine adjustability of the clamp bar 78 in FIG. 6 can be practiced in respect of any of the modifications illustrated except the modification of FIG. 5 wherein plate 60 is itself a carbide material.

Fine adjustment of the cutting element in FIG. 5, however, could be obtained by placing the fine adjusting screw in the rear end of clamp bar 64, or by providing for shims to be inserted between the rear end of clamp bar 64 and the rear end of the notch in which it is mounted, or by providing some expedient for finely adjusting support plate 60 on block 62 as by the use of an eccentric abutment screw or the like.

The notch in the upper edge of the support plate has been referred to as concave and as having a linear region at the insert end but it will be understood that the concavity of the groove is sufficiently slight that even if the entire groove from end to end were to be curved, the insert end would still be sufficiently linear to provide proper supporting for the insert.

Further, while the groove has been indicated as curved from end to end, it is quite possible to form the groove of two straight portions each inclined downwardly at a small angle from a respective end of the groove and meeting in about the middle of the length of the groove.

With regard to the securing of the support plate to the side of the block, a single slot in the support plate and a pair of screws extending therethrough into the block is sufficient for holding the support plate in position on the block when the loads imposed thereon by the cutting operation being performed are relatively light. When heavier loads are to be imposed on the cutoff tool, it is advantageous to provide a clamp screw extending therethrough into the block as near to the upper front corner of the block as is feasible. Under these circumstances, it is of advantage to provide two slots in the support plate as illustrated in FIG. 1 so that one of the clamp screws holding the plate to the block is located in the most advantageous position to hold the support plate against lateral deflection.

The vertical and longitudinal loads imposed on the support plate are absorbed by the block through the rigid abutments provided between the support plate and the block along the bottom edge of the support plate and at the rear end thereof.

It will be appreciated that the cutting insert, except when it is formed integrally with the support shank therefor, is quite small, and is, therefore, quite inexpensive, and can economically form a throw away item.

Further, the support plate itself is rather simply formed and if it should become damaged due to excessive loads imposed on the tool, it can economically be replaced by another.

Modifications may be made within the scope of the appended claims.

I claim:

1. In a tool for grooving or cut-off operations; a support block, a support plate clamped to one longitudinal side of said block and having one end projecting beyond the end of said block, said plate having an upper edge and an elongated V-groove in said upper edge of said plate, a bar-like element having a V-ridge along the bottom lower edge adapted to be received in said groove with one end disposed near said one end of said plate, a clamp member on the block adapted to engage said bar-like element on the top between the ends thereof and clamp the said bar-like element to the upper edge of said plate, cutting element means at said one end of said bar-like element and fixed against longitudinal movement relative to said bar-like element, and means for adjusting said cutting element means together with at least one of said bar-like element and said plate and bar-like element together in the longitudinal direction of said block, at least one of said groove in the upper edge of said plate and said ridge on the lower edge of said bar-like element being concave toward the other in the longitudinal direction whereby only the ends of said bar-like element takes a bearing on said plate.

2. A tool according to claim 1 in which said plate has a notch formed therein at said one end, and a hard seat member fixed in said notch and having a groove on the upper edge forming a continuation of the groove in the upper edge of said plate and adapted to form a bearing surface for said cutting element means.

3. A tool according to claim 1 in which said groove when viewed from the side of said plate is concave in the upward direction and said bar-like element is straight.

4. A tool according to claim 1 in which said bar-like element is formed of cemented hard metal carbide and has the sides thereof at said one end divergent toward said one end and serving as the said cutting element means.

5. A tool according to claim 1 in which said bar-like element at said one end thereof has a nose portion projecting longitudinally from the upper portion, said cutting element means comprising a hard element substantially shorter than said bar-like element and having a ridge on the bottom resting in said groove and having a transverse ledge at the end facing said one end of said bar-like element, said nose portion clampingly engaging said ledge.

6. A tool according to claim 1 in which said bar-like element at said one end has a notch formed therein open at the top and on the side facing said one end of said bar-like element, and said cutting element means being fixedly mounted in said notch.

7. A tool according to claim 2 in which said bar-like element at said one end thereof has a nose portion projecting longitudinally from the upper portion, said cutting element means comprising a hard element substantially shorter than said bar-like element and having a ridge on the bottom resting in said groove and having a transverse ledge at the end facing said one end of said bar-like element, said nose portion clampingly engaging said ledge, said cutting element means resting on said hard seat member.

8. A tool according to claim 1 in which the upper edge of said plate comprises an upstanding portion at the rear end of the said groove forming abutment means for the rear end of said bar-like element.

9. A tool according to claim 8 which includes a longitudinal screw in said upstanding portion and abutting the rear end of said bar-like element.

10. A tool according to claim 1 in which said block has a recess formed therein to accommodate said plate, the lower edge of said plate inclining downwardly toward said block and the lower edge of said recess being inclined downwardly toward the bottom of the recess and engaging the lower edge of said plate.

11. A tool according to claim 1 in which at least one of said block and said plate includes longitudinal slot means, and clamp screws extending through said slot means and threaded into the other of said block and said plate.

12. A tool according to claim 1 in which said block in the region near the end of said plate opposite the said one end thereof includes abutment means adjustably mounted thereon and abutting the adjacent end of said plate.

13. A tool according to claim 12 in which said abutment means comprises a screw having a head abutting said plate and a plurality of threaded holes distributed longitudinally of said block for receiving said screw.

14. A tool according to claim 1 in which said plate is formed of a cemented hard metal carbide.

15. A tool according to claim 11 in which said slot means is formed in said plate and the screws are threaded in said block, said screws including at least one screw extending through said plate near the top of said block near said one end thereof to support said plate against lateral deflection on said block.

* * * * *